Patented Apr. 24, 1945

2,374,246

UNITED STATES PATENT OFFICE 2,374,246

METHOD OF MAKING A MOLDED PRODUCT

Harden F. Taylor, New York, N. Y., assignor to The Atlantic Coast Fisheries Company, New York, N. Y., a corporation of Maine No Drawing. Application June 4, 1941, Serial No. 396,502

10 Claims. (Cl. 107—54)

This invention relates to molded vitamin preparations, and more particularly to molded vitamin preparations which are symmetrical in shape, as well as the method of preparing the same.

In United States patents, Nos. 2,218,591 and 2,218,592, there is disclosed a molded vitamin product containing discrete particles of a vitamin-bearing oil containing vitamin A dispersed in a matrix comprising a gelable colloid, such as gelatin, said matrix preferably containing a plasticizer which, in addition to protecting the vitamins against deterioration upon exposure of the products to air, also maintains the accessibility of the vitamin-bearing liquid or oil to the digestive tract, whereby the vitamin-bearing liquid or oil is easily assimilated.

According to the aforementioned patents, a liquid emulsion having a continuous phase comprising an aqueous solution of a gelable colloid, such as gelatin, with or without a plasticizer, and an internal dispersed phase comprising discrete particles of a vitamin-bearing oil containing vitamin A is prepared at an elevated temperature. The emulsion, while still in the liquid state and at an elevated temperature, is formed into the desired shape by a molding or other appropriate procedure, in which shape it is permitted or caused to gel. Subsequently, the gel product is, after any other necessary or preferred operation, finally dried.

One of the procedures attempted to produce individual units of predetermined sizes and shapes was to introduce the emulsion in a two-piece mold and, after the emulsion was caused or permitted to gel therein, to remove the mold, as by separation of the members thereof, and dry the individual gelled units. Though by the use of two-piece molds it was possible to produce tablets or globules of a great variety of surface contours, such as spheres, ovoids, spheroids, either prolate or oblate, etc., nevertheless, such apparatus and procedure were not satisfactory. Molding individual units in two-piece molds was slow and relatively expensive. Due to the time required to cool and set the composition in the molds, the output of a given machine and of a given amount of labor was small. Also, the products of the two-piece molds had finned seams and, if injection molding was practiced, sprues were additionally present on the products at those parts which in the mold were located at the ports of entry and exit. Due to the fins and sprues on the molded units, the latter were not uniform and could not be substantially uniformly coated with sugar, chocolate or other coating, as is desired in many instances. The fins and sprues could be removed but such operations would be tedious and expensive and invariably mar the smoothness of the surface.

Another method of making individual units of predetermined shape comprised depositing measured portions of the liquid composition into depressions previously formed in a mass of powdered material, such as starch or the like. Such a method has long been used in the confectionery art and has the advantages of speed, simplicity and economy. However, such a method was inadequate to produce molded unit products of predetermined shapes which were symmetrical, both radially and bilaterally, to meet the exacting requirements of pharmaceutical products to provide for easy application of a uniform, thin coating of sugar, chocolate, etc.

When the method referred to in the paragraph immediately preceding was used, the desired depression was made in the starch and at least one surface of the maximum dimension was left open and a certain minimum draft was allowed in the mold, otherwise the recess could not be impressed in the starch. When a gelable composition was introduced in such depression and permitted to gel therein, the upper exposed surface of the product assumed a shape and contour which was different from the lower surface thereof which corresponded to that impressed in the mold. As a consequence, the product was not symmetrical, both radially and bilaterally.

An object of this invention is to produce molded individual units which are symmetrical, both laterally and bilaterally, and of predetermined shape and size.

Another object of this invention is to provide a method of producing molded individual units which are symmetrical, both radially and bilaterally.

A still further object of this invention is to provide a mold, and method of making the same, which will produce a molded product which is symmetrical, both radially and bilaterally.

A specific object of this invention is to provide symmetrical, both radially and bilaterally, molded individual units having discrete particles of a vitamin-bearing oil containing vitamin A dispersed in a matrix formed of a gelable colloid, such as gelatin, and preferably also containing a plasticizer, and the method of making the same.

Other objects will appear from the following description and appended claims.

In accordance with the principles of this invention, a depression of predetermined horizontal dimensions and shape is formed in a smooth surface in a mass of starch contained on a suitable support, as in a tray, to constitute a test mold. In the production of this test mold, the shape of the bottom of the depression is immaterial and of no consequence.

The emulsion which has been previously prepared, and while still in the liquid state (i. e. at an elevated temperature), is then introduced or deposited in the test mold. It is to be noted that the emulsion which is introduced into the test mold is substantially identical in density, viscosity, surface tension and temperature with the emulsion which is to be used in the ultimate process. The quantity of emulsion introduced in the test mold is such that it will overfill the mold, whereby a portion thereof will project above the horizontal top surface of the starch. The exposed free upper surface of the emulsion will naturally assume a definite curvature. This curvature will always be the same, provided the factors (viscosity, density, surface tension and temperature of the emulsion) which determine it are always the same and, once the conditions for producing it have been established, it can be repeated indefinitely.

After the emulsion has been introduced into the test mold as above described, it is permitted to solidify (gel). It is then removed from the mold and by appropriate method, such as optical projection, the precise shape and contour of the curve of the surface which was exposed in the test mold are determined.

In one form of the invention, after having ascertained the curvature of the exposed surface of the gelled product produced in the test mold, as previously described, a printing board is prepared with a plurality of projections in bas-relief from the surface thereof, each projection conforming precisely to the curvature of the exposed surface of the product produced in the test mold, as previously described. The printing board may be provided with any number of projections and may be arranged in any desired manner, such as in a plurality of spaced horizontal rows.

The printing board, and particularly the projections thereof, is then impressed into starch whereby recesses or depressions having substantially the identical shape and contour of the projections are produced. These recesses or depressions therefore have a shape and contour substantially identical with the shape and contour of the exposed surface in the test mold. The mold made from the printing board constitutes the final mold.

After the final mold has been made as above described, the emulsion is introduced therein in an amount to overfill the depression to the same extent as was obtained in the test mold. The upper free exposed surface of the emulsion will assume its natural curvature which, due to the method of making the mold, is substantially precisely the same as that of the depression of the mold. After the emulsion has gelled, it is removed from the mold and dried.

Since the shape and volume of the lower half of the formed product is determined by the shape and size of the impression in the starch, and the upper half is determined by the quantity of material, its viscosity, density and surface tension, it is obvious that the total quantity of fill should be twice the volume of the depression in the starch in order to secure a perfectly symmetrically shaped form. Of course, in practice, slight deviation from this quantity would be permissible, although theoretically any deviation would result in a slightly unsymmetrical product. Where a symmetrical product of 350 milligrams is wanted, the depression should have volumetric capacity sufficient for 175 milligrams, and the overfill should be 175 milligrams. Up to a 10% variation would not be a serious departure.

In order to more fully explain the invention, the following specific illustrative embodiment is set forth:

An emulsion of substantially the following formula is prepared as hereinafter set forth:

| | Parts by weight |
|---|---|
| Continuous phase: | |
| Granulated or sheet gelatin | 400 |
| Plasticizer—corn syrup— | |
| 35% dextrose | |
| 47% dextrine | 600 |
| 18% water | |
| Water | 720 |
| Dispersed phase: | |
| Vitamin-bearing oil containing vitamin A | 1,000 |

The emulsion is prepared by dissolving the corn syrup in the water and thereafter the diluted syrup or aqueous syrup solution is added to the gelatin. The gelatin is permitted to soak, preferably at room temperature, in the aqueous syrup solution until the gelatin has imbibed substantially all of the diluted syrup. This generally takes several hours. The soaked gelatin is then heated to 65° C. After the gelatin has dissolved, the resultant solution is agitated and, while continuously agitated, the vitamin-bearing oil is introduced and dispersed therein to form a smooth, uniform emulsion.

An oblate semi-ellipsoid depression ⅜ of an inch in diameter on the major axis and having a volumetric capacity to contain 175 milligrams of the emulsion is formed in starch on any suitable support to produce the test mold. 350 milligrams of the emulsion are deposited in the depression. 175 milligrams of the emulsion constitute the overfill and will project above the horizontal level of the starch. The remaining 175 milligrams of the emulsion will, of course, lie within the depression.

After the emulsion has been caused to gel in the test mold, the curvature of the overfill, preferably after removal from the test mold, is projected against cross-section paper and is found to be an oblate semi-ellipsoid whose major axis (⅜ of an inch) is approximately twice the minor axis (1/16 of an inch).

Having thus ascertained the curvature of the overfill of the product produced in the test mold, a printing board having a plurality of spaced semi-ellipsoid projections in bas-relief from the surface thereof and arranged in spaced horizontal rows, each projecting semi-ellipsoid having a semi-major axis of 1/16 of an inch and a semi-minor axis of 1/32 of an inch is prepared as more fully explained hereafter.

The printing board, and likewise the projections thereon, may be made of any desired material. Satisfactory results have been obtained when the base of the printing board was formed of composition reconstructed wood, such as Masonite (which is dried wood pulp bonded with plastic and pressed to a hard, smooth, uniform surface), or of a steel plate ground to a smooth, flat surface. Irrespective of the composition or nature of the base of the printing board, the latter is drilled with a plurality of holes corresponding to the desired number of projections. Highly satisfactory results have been obtained when these holes were arranged in spaced parallel rows, each row containing a plurality of spaced holes. The projections were made of copper. In the specific form employed, copper rivets with shanks of about 5/8 of an inch long and mushroom heads were chucked in the lathe and the heads turned to a true semi-ellipsoid of the precise size and shape, shown by the cross-section paper, by means of an elliptical lathe tool. These rivets were then polished with rouge and the shanks forced into the holes in the plate. In this way a plurality of projections were provided on the plate, each projection being a semi-oblate ellipsoid whose major axis was within the plane of the plate itself and whose semi-minor axis was perpendicular thereto.

A wooden tray is filled with starch and the surface scraped over with a smooth straight edge to make said starch exactly flush with the rims of the tray. The size of the tray is such as to accommodate the printing board previously described. The printing board is inserted in a press which is so adjusted that each of the impressions made by the projections of the printing board in the starch in the tray will be exactly of the same depth. Thus, a plurality of depressions will be formed in the starch corresponding to the projections of the printing board. Each depression will be of a shape and contour substantially identical with the projections. The surface of each depression specifically described in this example will be a semi-oblate ellipsoid whose major axis is within the plane of the top surface of the starch and its semi-minor axis is perpendicular thereto. Thus, when 350 milligrams of the emulsion are introduced therein, approximately 175 milligrams thereof will constitute the overfill and the upper free exposed surface thereof will naturally assume substantially the identical shape and contour as the lower surface in contact with the starch. As a result, each article molded in each depression of the final mold will be an ellipsoid whose major axis is twice the minor axis and whose exposed surface is of substantially uniform mathematical curvature.

In actual practice, after the final mold has been prepared, the necessary predetermined quantity of emulsion is deposited in each depression and permitted to remain therein until the emulsion has set to a firm gel, after which it is removed and dried in the manner known in the art.

In molded vitamin products of the type previously described and produced as above described and dried, the shrinkage does not set up any strain which will warp the products from their true geometrical shape. Such a product has the additional advantage in that, since it is curved throughout its entire surface and free of any straight edges, corners, projections, fins, etc., it can be easily coated with a uniform, thin coating of sugar, chocolate, etc.

Products produced in accordance with this invention have many important advantages and features. The pharmaceutical industry is most exacting in its requirements following the standards set up by the medical profession and the United States Pharmacopoeia. Doses must be accurate and the products must be uniform not only in content but in shape and appearance. These facts will become more apparent upon consideration of what happens when small forms of gelatin are dried. When wet gelatin gels or is dried, it is highly desirous to avoid case-hardening. As moisture escapes from the surface of gelatin tablets being dried, this moisture is replaced by water from the interior. If the rate of removal of moisture from the surface exceeds the rate of arrival at the surface from the interior, then the surface itself will become hard and dry. The edges will become rigid for the thicker or rounder portions. Once these have hardened and the drying continues, the portions which dry later shrink and pull upon the already established dry framework around the edges and corners. The result is distortion and uneven shrinkage. For example, when discs or other horizontals are dried, the circular edges set to a rigid framework before the center is dried. The later drying of the center results in the shrinkage of the same, whereupon the flat ends of the horizontals become convex which is the worst possible condition for uniform coating. The oblate spheroidal or ellipsoidal shape of uniform radial and bilateral symmetry and of continuously curving surface which characterizes one form of this invention gives rise to a continuously rigid exterior even in the case of slight case-hardening, a matter of much importance in the pharmaceutical world. The products of this invention likewise contain an accurate dose and are uniform as to content.

Though the invention has been described specifically in connection with vitamin preparations, it is to be understood that it is not restricted thereto. It may be used in the production of any product molded in starch or other substance having properties similar to starch by the general method herein described.

The expression "gelable composition" is used in the specification and claims to cover a composition which can be converted from a liquid to the gel or solid or semi-solid state.

Since it is obvious that various changes and modifications may be made in the above description without departing from the nature or spirit thereof, this invention is not restricted thereto except as set forth in the appended claims.

I claim:

1. A method of making a mold for producing a product of substantially uniform radial and bilateral symmetry which comprises forming a test mold having a depression of predetermined horizontal dimensions and shape, introducing a gelable composition which is to constitute the final product and under the same conditions to be utilized during the manufacture of said final product into said depression in an amount to overfill said depression, whereby the exposed free surface of said composition in said depression will assume its natural curvature, solidifying the composition in said test mold, determining the curvature of the exposed surface of the product formed in said test mold, and producing a final mold having a depression of the same curvature as that of the exposed free surface of the product produced in said test mold.

2. A method of making a mold for producing a product of substantially uniform radial and bilateral symmetry which comprises forming a test mold having a depression of predetermined horizontal dimensions and shape, introducing a gelable composition which is to constitute the final product and under the same conditions to be utilized during the manufacture of said final product into said depression in an amount to overfill said depression, whereby the exposed free surface of said composition in said depression will assume its natural curvature, solidifying the composition in said test mold, determining the curvature of the exposed surface of the product formed in said test mold, preparing a printing board with projections in bas-relief and of a curvature substantially identical to that of the said exposed surface of the test mold product, and impressing a mold-forming material substantially the same as used in forming the test mold with said projections to produce the final mold.

3. A method of making a mold for producing a product of substantially uniform radial and bilateral symmetry which comprises forming a test mold having a depression of predetermined horizontal dimensions and shape, introducing a gelable composition which is to constitute the final product and under the same conditions to be utilized during the manufacture of the final product into said depression in an amount to overfill said depression, whereby the exposed free surface of said composition in said depression will assume its natural curvature, solidifying the composition in said test mold, determining by optical projection the shape of said curvature, forming a printing board with projections, each of said projections having a curvature identical with that determined by said optical projection, and impressing a mold-forming material substantially the same as used in forming the test mold with said projections to produce the final mold.

4. A method of making a mold for producing a product of substantially uniform radial and bilateral symmetry which comprises forming a test mold having a depression of predetermined horizontal dimensions and shape, introducing a gelable composition which is to constitute the final product and under the same conditions to be utilized during the manufacture of the final product into said depression in an amout to overfill said depression, whereby the exposed free surface of the composition in said depression will assume its natural curvature, solidifying the composition in said test mold, projecting said curvature on cross-section paper to determine the precise contour of said curvature, forming a printing board with a plurality of projections, each of said projections having a contour identical with that determined on the cross-section paper, and utilizing said projections to produce the final mold.

5. A method of making a mold for producing a product of substantially uniform radial and bilateral symmetry which comprises forming a depression of predetermined horizontal dimensions and shape in a mass of starch to provide a test mold, introducing a gelable composition which is to constitute the product and under the same conditions to be utilized during the manufacture of the final product into said depression in an amount to overfill said depression, whereby the exposed free surfaces of the composition in said depression will assume its natural curvature, solidifying the composition in said test mold, and producing a final starch mold having a depression of the same curvature as that of the exposed free surface of the product produced in the test mold.

6. A method of making a mold for producing a product of substantially uniform radial and bilateral symmetry which comprises forming a depression of predetermined horizontal dimensions and shape in a mass of starch to provide a test mold, introducing a gelable composition which is to constitute the product and under the same conditions to be utilized during the manufacture of the final product into said depression in an amount to overfill said depression, whereby the exposed free surfaces of the composition in said depression will assume its natural curvature, solidifying the composition in said test mold, preparing a printing board with projections in bas-relief, each projection being of a curvature substantially identical to that of the said exposed surface of the test mold product, and impressing a mass of starch with said projections to produce the final mold.

7. A method of making a mold for producing a product of substantially uniform radial and bilateral symmetry which comprises forming a test mold having a depression of predetermined horizontal dimensions and shape, introducing a gelable composition which is to constitute the final product and under the same conditions to be utilized during the manufacture of said final product into said depression in an amount to overfill said depression, whereby the exposed free surface of said composition in said depression will assume its natural curvature, solidifying the composition in said test mold, and producing a final mold having a depression of the same curvature as that of the exposed free surface of the product produced in said test mold.

8. A method of making a mold for producing a product of substantially uniform radial and bilateral symmetry which comprises forming a test mold having a depression of predetermined horizontal dimensions and shape, introducing a gelable composition which is to constitute the final product and under the same conditions to be utilized during the manufacture of said final product into said depression in an amount to overfill said depression, whereby the exposed free surface of said composition in said depression will assume its natural curvature, solidifying the composition in said test mold, preparing a printing board with projections in bas-relief and of a curvature substantially identical to that of the said exposed surface of the test mold product, and impressing a mold-forming material substantially the same as used in forming the test mold with said projections to produce the final mold.

9. A method of making a mold for producing a product of substantially uniform radial and bilateral symmetry which comprises forming a depression of predetermined horizontal dimensions and shape in a mass of starch to provide a test mold, introducing a gelable composition which is to constitute the final product and under the same conditions to be utilized during the manufacture of the final product into said depression in an amount to overfill said depression, whereby the exposed free surface of said composition in said depression will assume its natural curvature, solidifying the composition in said test mold, determining by optical projection the shape of said curvature, forming a printing board with projections, each of said projections having a curvature identical with that determined by said optical projection, and impressing a mass of starch with said projections to produce the final mold.

10. A method of making a mold for producing a product of substantially uniform radial and bilateral symmetry which comprises forming a depression of predetermined horizontal dimensions and shape in a mass of starch to provide a test mold, introducing a gelable composition which is to constitute the final product and under the same conditions to be utilized during the manufacture of the final product into said depression in an amount to overfill said depression, whereby the exposed free surface of the composition in said depression will assume its natural curvature, solidifying the composition in said test mold, projecting said curvature on cross-section paper to determine the precise contour of said curvature, forming a printing board with a plurality of projections, each of said projections having a contour identical with that determined on the cross-section paper, and utilizing said projections to produce the final mold.

HARDEN F. TAYLOR.